United States Patent

West et al.

[11] Patent Number: 6,131,148
[45] Date of Patent: Oct. 10, 2000

[54] SNAPSHOT COPY OF A SECONDARY VOLUME OF A PPRC PAIR

[75] Inventors: Christopher James West, Boulder; David Alan Serls, Littleton, both of Colo.

[73] Assignee: International Business Machines Corporation, Armonk, N.Y.

[21] Appl. No.: 09/013,712

[22] Filed: Jan. 26, 1998

[51] Int. Cl.[7] .................................................. G06F 12/16
[52] U.S. Cl. .......................... 711/162; 711/114; 711/161; 711/165; 707/204; 714/6
[58] Field of Search .................................. 711/114, 161, 711/162, 165; 714/6; 707/204

[56] References Cited

U.S. PATENT DOCUMENTS

| | | | |
|---|---|---|---|
| 5,210,866 | 5/1993 | Milligan et al. | 711/6 |
| 5,241,670 | 8/1993 | Eastridge et al. | 714/1 |
| 5,375,232 | 12/1994 | Legvold et al. | 711/162 |
| 5,379,412 | 1/1995 | Eastridge et al. | 711/162 |
| 5,487,160 | 1/1996 | Bemis | 711/114 |
| 5,555,371 | 9/1996 | Duyanovich et al. | 714/13 |
| 5,574,851 | 11/1996 | Rathunde | 714/7 |
| 5,604,862 | 2/1997 | Midgely et al. | 714/6 |
| 5,649,152 | 7/1997 | Ohran et al. | 711/114 |
| 5,692,155 | 11/1997 | Iskiyan et al. | 711/162 |
| 5,790,773 | 8/1998 | DeKoning et al. | 714/6 |
| 5,835,953 | 11/1998 | Ohran | 711/162 |

FOREIGN PATENT DOCUMENTS

| | | |
|---|---|---|
| 0784273A2 | 7/1997 | European Pat. Off. . |
| 8-509565 | 8/1996 | Japan . |
| 8-344897 | 5/1997 | Japan . |
| WO94/25919 | 10/1994 | WIPO . |

*Primary Examiner*—Hiep T. Nguyen
*Attorney, Agent, or Firm*—Ohlandt, Greeley, Ruggiero & Perle, L.L.P.

[57] ABSTRACT

The present invention provides a method and apparatus for setting up a Peer-to-Peer Remote Copy (PPRC) session and snapshot copying a remote secondary volume to another volume on the remote subsystem. The apparatus includes a primary storage subsystem having a primary data-storage device with at least a primary volume. A primary processing unit relays a request to perform a snapshot copy of at least a portion of the primary volume to a secondary storage subsystem. The secondary storage subsystem includes a secondary data-storage device having a secondary volume which is maintained in a duplexed state with the primary volume through the use of remote copy sessions. A secondary processing unit, responsive to the relayed request can perform an equivalent of a snapshot copy of at least a portion of the primary volume by making a snapshot copy of a corresponding portion of the secondary volume.

16 Claims, 5 Drawing Sheets

SNAPSHOT COPY OF A SECONDARY VOLUME OF A PPRC PAIR

FIELD OF THE INVENTION

The present invention relates to snapshot copying of a volume of a data-storage system which employs remote dual copying techniques between a primary storage subsystem and a remote secondary storage subsystem and, more specifically, to the performance of an equivalent of a snapshot copy of a volume in a primary storage system at a remote secondary data-storage system.

BACKGROUND OF THE INVENTION

It is important to provide either a local and/or remote copying capability of data for real-time backup protection of data stored in a data processing installation, such as in peripheral data-storage. Backing up or copying to a remote data center protects against physical disasters not protected by a local_ backup copy. This automatic data copying is commonly referred to as remote duplexing or remote data copying. The prior art is replete with methods and means for backing up data for recovery and archiving purposes. An example of such a system can be found in U.S. Pat. No. 5,555,371 to Duyanovich et al.

Although backup copying techniques are frequently utilized to preserve and protect data, the use of more than one remote or secondary backup storage site is cost prohibitive, particularly for data-storage systems that store large amounts of data. Accordingly, there is a need to provide additional cost efficient data preservation techniques.

A more cost efficient data preservation technique is to perform a snapshot copy. A snapshot copy is an image of the physical location or directory (i.e., the physical address, size, etc.) of data in the data-storage unit (which may include a plurality of volumes). The snapshot copy can be used either to restore an image of a protected data-storage unit if the data-storage unit should fail, or to compare historical snapshots of data from a specified prior time period to a current version of the data. The advantages of snapshot copying is that a snapshot copy of any data file, volume, etc. can be accessed in a matter of seconds, and the snapshot copy allows the data file or volume to be restored to an original version at the instance of time the snapshot copy was taken.

One problem with snapshot copying is that access to a volume being snapshot copied is suspended until the snapshot operation is completed. This prevents the volume from being accessed or altered at the same time as a snapshot operation is being performed. Another problem is that snapshot copying requires storage space or addressing to be allocated for the snapshot copy. This is particularly problematic in data-storage systems with limited storage capacity or limited addresses. Accordingly, users are limited in the number of snapshot operations that can be performed without adversely affecting the efficiency, accessibility and storage capacity of the data-storage system.

There is a need for a method and apparatus to snapshot copy a volume on a primary storage subsystem without requiring storage space to be allocated at the primary storage subsystem for the snapshot copy. There is also a need to provide a method and apparatus to snapshot copy a volume on a primary storage subsystem, while simultaneously allowing the volume being snapshot copied to be accessed.

Accordingly, it is an object of the present invention to provide a method and apparatus for performing an equivalent of a snapshot copy operation of a volume of a primary data-storage subsystem without requiring storage space to be allocated at the primary data-storage.

It is a further object of the present invention to provide a method and apparatus for performing an equivalent of a snapshot copy of a volume of a primary data-storage subsystem, while allowing that volume to be accessed by a host device, during the performance of the snapshot copy operation.

Another object of the present invention is to provide a method and apparatus which employs a secondary data-storage subsystem to perform the equivalent of a snapshot copy of a volume of a primary data-storage subsystem.

It is also an object of the present invention to provide a method and apparatus for performing a snapshot copy of a volume of a primary data-storage device which can be integrated into pre-existing data-storage systems that already perform remote dual copying of volumes.

SUMMARY OF THE INVENTION

The present invention provides a method and apparatus for setting up a Peer-to-Peer Remote Copy (PPRC) session and snapshot copying a remote secondary volume to another volume on the remote subsystem. The apparatus includes a primary storage subsystem having a primary data-storage device with at least a primary volume. A primary processing unit relays a request to perform a snapshot copy of at least a portion of the primary volume to a secondary storage subsystem. The secondary storage subsystem includes a secondary data-storage device having a secondary volume which is maintained in a duplexed state with the primary volume through the use of remote copy sessions. A secondary processing unit, responsive to the relayed request can perform an equivalent of a snapshot copy of at least a portion of the primary volume by making a snapshot copy of a corresponding portion of the secondary volume.

To ensure that the snapshot copy of the secondary volume is equivalent to a snapshot copy of the primary at the particular instance of time, it is important to maintain the primary volume and secondary volume in a duplexed state. This is accomplished by updating the secondary volume and the secondary directory information as the primary volume is altered. Accordingly, it is preferred that a snapshot copy operation of the secondary volume is not performed while the secondary volume is being updated. That is, the primary subsystem checks to ensure that the primary and secondary volume are in a duplexed state before allowing a snapshot copy operation to be performed, thereby avoiding copying erroneous data.

The present arrangement avoids delay and storage problems at the primary subsystem associated with the performance of a snapshot copy operation of the primary volume. That is, a snapshot copy operation can be performed at the secondary subsystem to achieve the same result, i.e., an equivalent of a snapshot copy of the primary volume. The snapshot copying feature of the present invention can also be incorporated into storage systems that already employ peer-to-peer remote copying (PPRC) techniques to backup volumes.

DETAILED DESCRIPTION OF THE PREFERRED EMBODIMENTS

Before proceeding with a detailed description of the drawings, it is well to define certain terms to be used herein. The term "backup copying" will hereinafter refer to the operation of making a duplicate copy of a primary volume of a primary data-storage subsystem on a remote secondary data-storage subsystem. Other terms associated with backup copying are duplexing, dual copying, mirroring and so forth, all of which are generally known in the art. A peer-to-peer remote copy (PPRC) session or remote backup copy session will refer to an implementation of a backup copying sequence of updated data in a primary volume to a secondary volume.

The term "remote" should not be construed to limit the location of the primary and secondary volumes. The primary subsystem and secondary subsystem can be at different locations or within the same data center. The primary and secondary data-storage systems can also be independent from each other or attached to the same or different host processors.

Peer-to-Peer remote copy (PPRC) refers to a primary volume of a primary subsystem and a duplicate copy of the primary volume, i.e., a secondary volume, which resides in a remote storage location, such as a secondary subsystem. The PPRC is maintained in a duplexed state through the use of remote backup copying sessions. For the purposes of clarity, the PPRC will hereinafter refer to a primary volume of a primary subsystem and a secondary volume of a remote secondary subsystem.

A snapshot copy of a volume refers to a copy of the logical directories of the volume. The logical directories associate data to physical locations, i.e., tracks, of the volume. The snapshot copy provides an image of the volume, particularly the arrangement of the data in the volume, at a particular instance of time that the snapshot copy was performed. The snapshot copy of a volume allows the volume to be reconstructed or compared to the state of the volume at the time the snapshot copy was performed.

Figure 1:
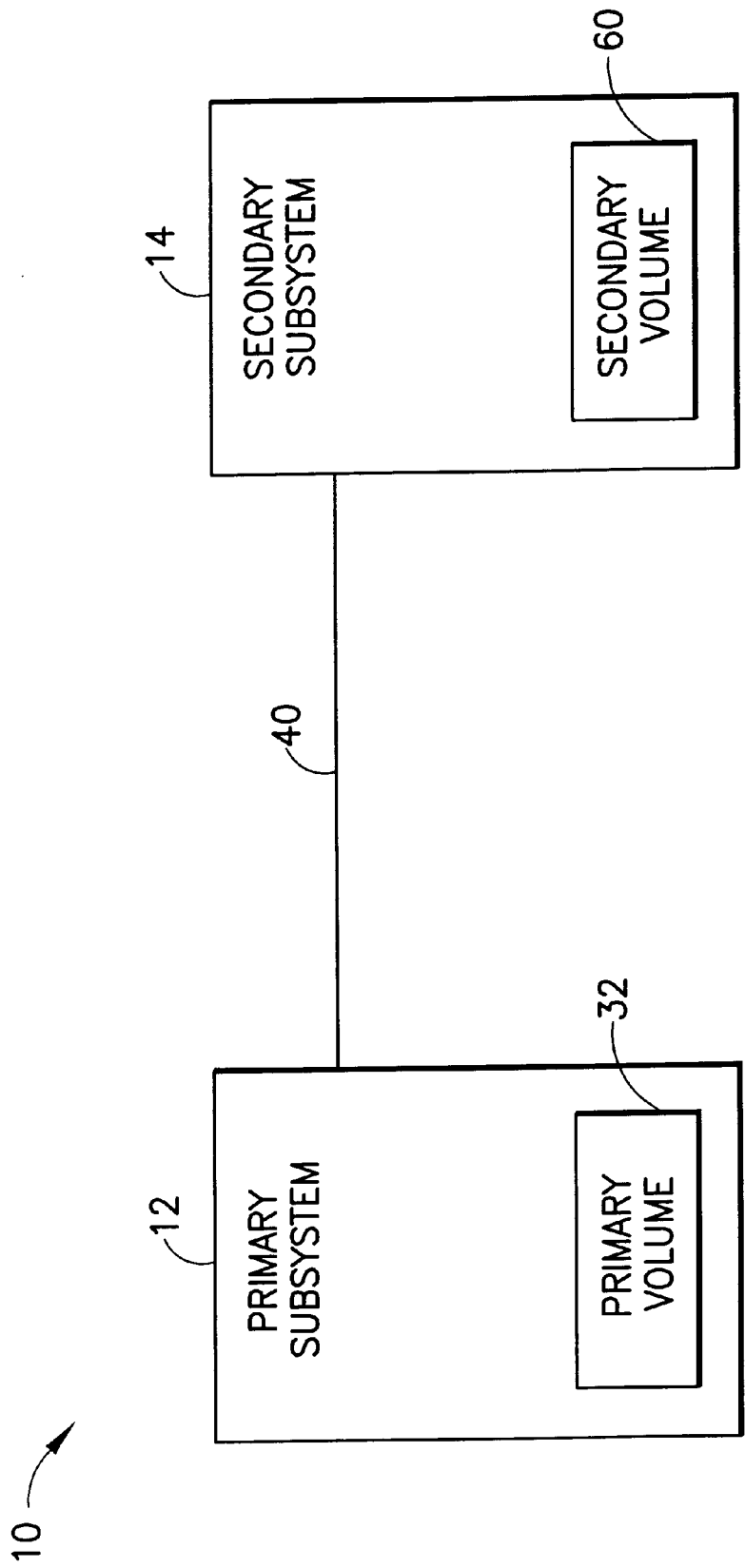
FIG. 1 illustrates an overall architectural view of a data-storage system, in accordance with the present invention.

Turning to the detailed description of the present invention, FIG. 1 illustrates an overall architectural view of a data system 10 which includes a primary subsystem 12 and at least one remote secondary subsystem 14, connected across a communication interface 40. Primary subsystem 12 receives, generates or alters data that is stored locally in a primary volume 32. The data in primary volume 32 is backed up through the use of remote backup copying sessions to a duplicate secondary volume 60 of secondary subsystem 14 for disaster recovery. Thus, primary and secondary subsystems 12 and 14 cooperate to automatically transfer data for backup, so that primary volume 32 and secondary volume 60 are in a duplexed state.

To avoid delay and storage problems at primary subsystem 12 associated with the performance of a snapshot copy operation of primary volume 32, it has been discovered that the snapshot copy operation can be performed at secondary subsystem 14 to achieve the same result, i.e., an equivalent of a snapshot copy of primary volume 32. That is, secondary subsystem 14 has stored therein a duplicate copy of primary volume 32, i.e., secondary volume 60. Secondary subsystem 14 can thus provide the equivalent of a snapshot copy of primary volume 32 by performing a snapshot copy operation on secondary volume 60.

In operation, primary subsystem 12 receives a snapshot request from a host device or user (not shown) to perform a snapshot copy operation on primary volume 32. Primary subsystem 12 relays or retransmits the snapshot copy request to secondary subsystem 14. Thereafter, secondary subsystem 14 performs a snapshot copy of the secondary volume and, upon completion thereof, signals primary subsystem 12 of the completion of the snapshot copy operation. The snapshot copy can then be stored in another volume, another remote subsystem, in virtual memory to be archived at a later time or in any other location other than the volume being snapshot copied.

It is important to understand that such an arrangement provides the equivalent of a snapshot copy of primary volume 32, without suspending access to the primary volume or requiring storage space to be allocated at the primary subsystem 12 for the snapshot copy. As a result, numerous snapshot copies of primary volume 32 can be performed without adversely affecting the efficiency and accessibility of primary subsystem 12, particularly primary volume 32.

Figure 2:
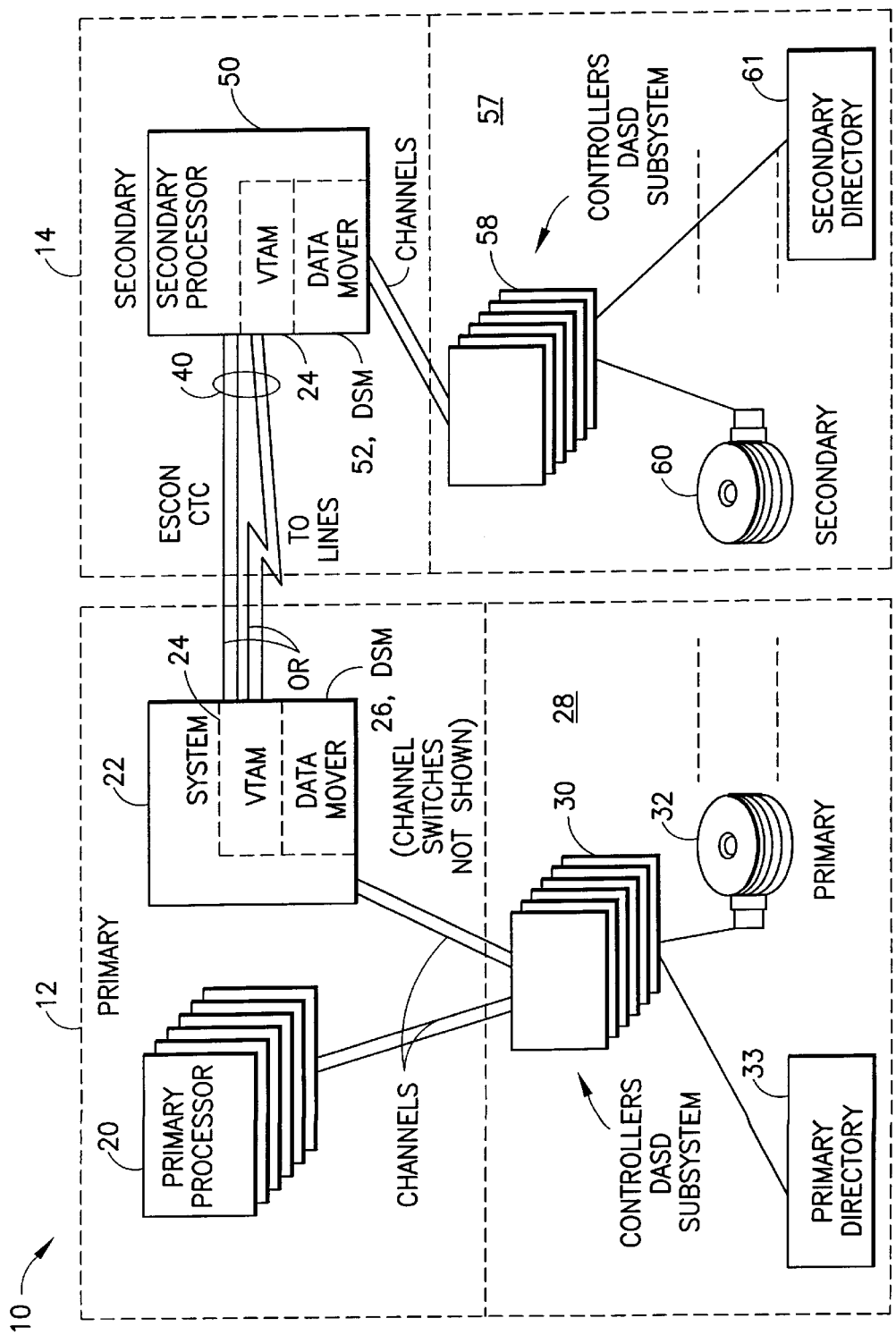
FIG. 2 illustrates a block diagram of the components of a data-storage system, in accordance with the present invention.

Referring to FIG. 2, primary subsystem 12 includes a data-storage system 28 and a primary processor 20 which manages the remote dual copying and snapshot copying processes of the present invention. Primary subsystem 12 preferably includes an additional data processing system 22 to perform the actual receipt and transfer of messages to secondary subsystem 14. Primary data-storage system 28 stores data and may be a typical multi-path plural device data-storage system having a plurality of volumes, including primary volume 32. Primary data-storage system 28 can employ any data allocation technique to relate logical addresses to physical locations of the storage device, such as primary volume 32. It is preferred that primary data-storage system 28 utilizes a log-structured array (LSA). Such allocation information is maintained in primary directory 33.

Secondary subsystem 14 includes a secondary processor 50 which also manages the remote dual copying and snapshot copying processes of the present invention, and a secondary data-storage system 57 preferably arranged in an LSA or the like. A secondary directory 61 is employed to provide addressability to data stored in secondary data-storage system 57, such as in secondary volume 60. Secondary subsystem 14 may also employ a pending write directory 121 (shown in FIG. 4) to buffer address information for updated data stored in secondary data-storage system 57, but not yet addressable through secondary directory 61 for each pending write update session or one pending write update directory for all write update sessions.

Primary processor 20 and data processing system 22 control the internal operations of primary subsystem 12, such as the performance of a remote backup copy session of updated data on primary volume 32 to secondary subsystem 14, monitoring of the storage of data, copying all update data of primary volume 32 to secondary system 14 for storage on secondary volume 60 of secondary data-storage system 57. For achieving such data-storage monitoring in primary data-storage system 28, processor 20 can supply a command, such as an PSF ESTABLISH Perform Subsystem Function (PSF) command, to peripheral controller 30 which has a subsystem access facility to primary volume 32.

System inter-connection 40 is a communication system which connects primary subsystem 12 to remote secondary subsystem 14. Data processing system 22 of primary subsystem 12 effects the actual data transfer for data system 10, during each pending write session. Data processing system 22 includes a known operating system (OS) (not separately shown). The known OS includes a data serializer and mover (DSM) 104 and Virtual Telecommunications Access Method (VTAM) 106 or the like for effecting communications between primary and secondary subsystems 12, 14, via system inter-connection 40. A system inter-communication system includes inter-connection 40 plus VTAM 24, DSM 26 and data mover 52.

The serializer portion of DSM 26 assigns a write sequence token to every reported data-storage system 28 write operation with the ESTABLISHED range. The term "reported" means that a subsystem, embodied in each of the controllers 30, has transmitted a request to DSM 28 that updated and recorded data is to be remotely dual copied. Such reporting can include an assigned time stamp and sequence number. DSM 26 preferably inserts such time stamp and sequence number in a message being built. DSM 26, then places these write sequence tokens into inter-system messages for VTAM 24 to send to secondary subsystem 14. DSM 26 tracks the request by generating a table of requests, sequence numbers and time stamps (not shown).

The data mover portion of DSM 104 obtains changed or updated data-records written to primary subsystem 12. DSM 26, then combines such updated written records and their respective write sequence tokens into inter-system messages sent over system inter-connection 40 to VTAM 24 in secondary subsystem 14. DSM 26 can be considered an extension of primary data-storage system 28. Processor 50 then, using data mover 52, records the received data records in secondary data-storage system 57, logs the write sequence tokens in a journal (not shown) and updates secondary directory 61.

VTAM 24 in both of said primary and secondary subsystems 12 and 14 can be respective processor portions of known IBM Systems Network Architecture (SNA) communications systems and apparatus. Such architecture is described in the article "An Introduction to Network Architecture's and Protocols" by P. E. Green, IBM System Journal, Vol. 18, No. 2, 1979. For additional operation and implementation, reference also may be made to Harris et al., U.S. Pat. No. 4,914,619, "Apparatus and Method for Interconnection an Application of a Transparent Service Access Facility to Remote Source" and Astride et al., U.S. Pat. No. 4,855,905, "Multiprotocol I/O Communications Controller Unit Including Emulated I/O Controllers and Tables Translation of Common Commands and Device Addresses".

VTAM 24 can transfer the inter-system messages over known channel-to-channel (CTC) or ESCON portions of system inter-connection 40. The inter-system messages communicate from primary subsystem 12 to secondary subsystem 14 the establishment of shadowed (duplexed) data extents, write tokens that indicate updates in progress, write tokens with changed data to be applied to the secondary data copies, a snapshot copy request to perform a snapshot copy operation of a volume and so forth. System inter-connection 40 is preferably operative on high bandwidth communication networks of one or more CTC connections, coupling the primary and secondary subsystems. T1 lines, T3 lines, or other telecommunications services may be employed to support distances greater than ESCON or other direct CTC connections can support.

Secondary data mover 52 receives the inter-system messages sent by primary subsystem 12 via VTAMs 106, extracts and maintains the write sequence tokens, and records the received primary subsystem 12 updated data in secondary data-storage system 19. Data mover 52 can be considered to be an extension of secondary data-storage system 57. It should be understood that primary and secondary subsystems 12 and 14 may be in the same physical location to eliminate the need for a VTAM data communication link. That is, the physical spacing between primary and secondary subsystem 12 and 14, as well as the type of data-linking between them, is not limited to practicing the present invention.

Figure 3:
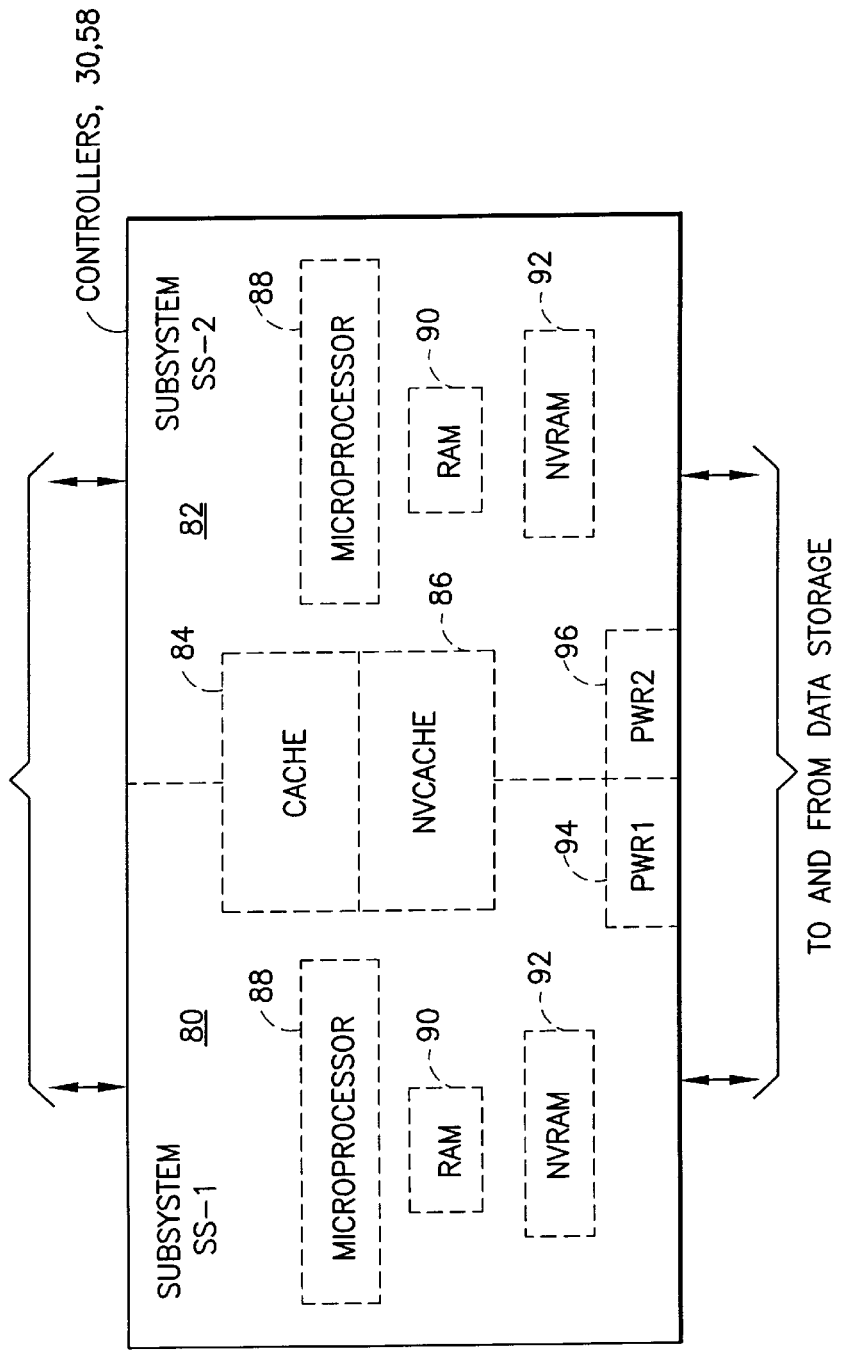
FIG. 3 illustrates a controller for a data-storage system in accordance with the present invention.

FIG. 3 illustrates one embodiment of controllers 30 and 58 which control the operation of storing data onto primary and secondary volumes 32 and 60, respectively and of updating primary directory 33 and secondary directory 61, respectively. Each controller 30 and 58 includes a CACHE 84, a NVCACHE 86, a microprocessor 88, Random Access Memory (RAM) 90, NVRAM 92, and a power source connection 94. The components of controller 30 and 58 are well known in the art and will not be discussed in further detail. It should be noted that primary directory 33 and secondary directory 61 can be stored in a non-volatile memory of NVRAM 92 their respective controllers 30 and 58 to provide easy access thereto.

Figure 4:
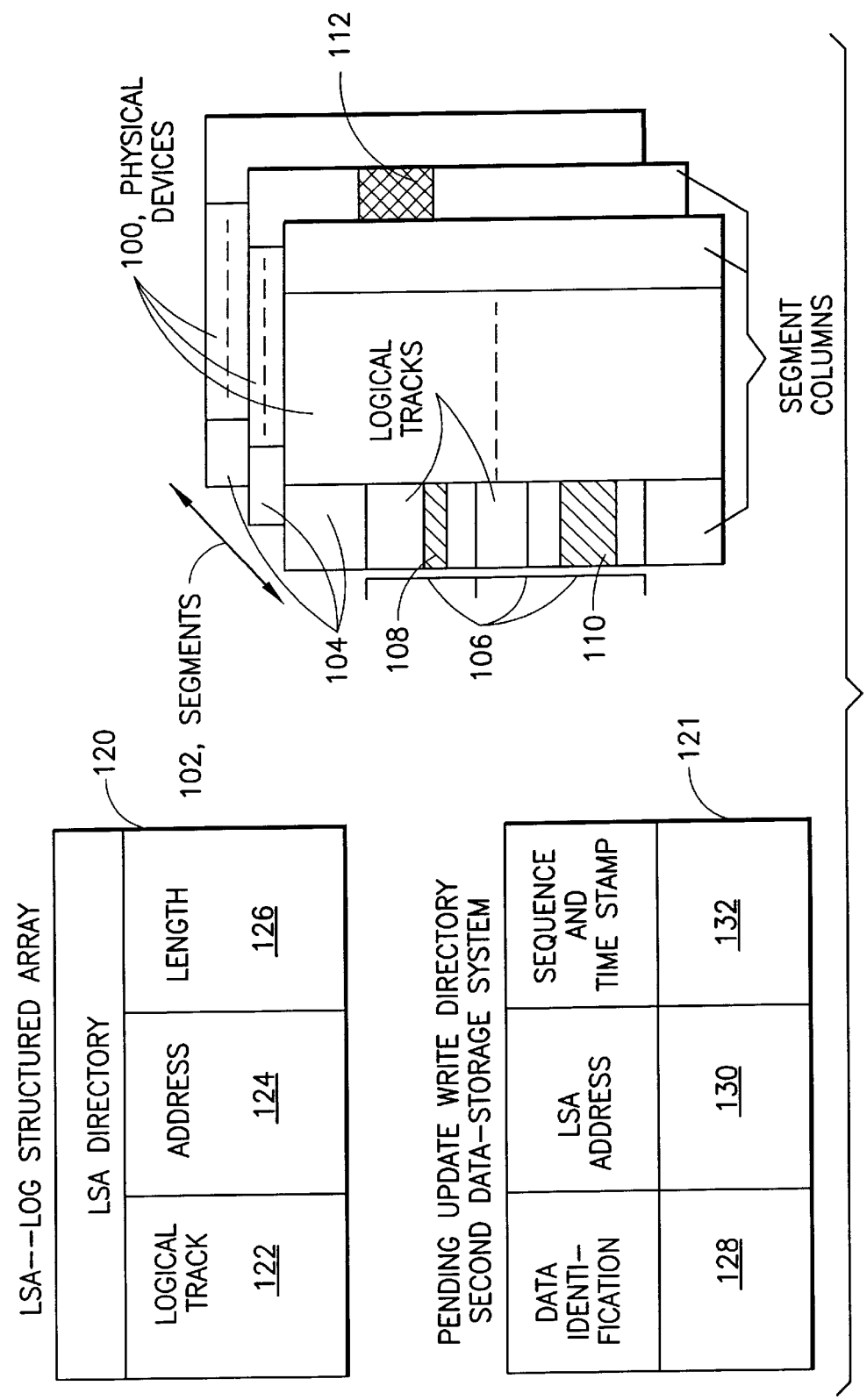
FIG. 4 illustrates a data-storage system employing a log-structured array (LSA) in accordance with the present invention.

FIG. 4 illustrates a preferred embodiment of primary and secondary directories 33 and 61 arranged in a log-structured array (LSA) format denoted by reference numeral 120. The term "data unit" is used herein to denote a given byte of a given record in a given file. In the present invention, all copies of updated data of primary volume 32 are copied to secondary volume 60 of secondary subsystem 14 to maintain the PPRC pair in a duplexed state.

In particular, controllers 30 and 58 write logical records to respective data-storage system 28 and 57. Updating records received in the respective data-storage systems 28 and 57 can be momentarily stored in volatile cache 112 or in NVCACHE 113 (FIG. 2) awaiting compression (if necessary) and retentive storage in the respective DASD. In primary subsystem 12, data is preferably stored in logical track units of logical volumes. Although secondary subsystem 14 may also store updated data in logical track volumes, this requirement may not be as important to the secondary subsystem because accessing of such dual copied data is mainly for recovery or replacement.

Primary and secondary directories 33 and 61 represented by LSA 120 can store variable length logical records in addressable logical tracks for their respective primary and secondary volumes 32 and 60. Such logical tracks may be stored as a single block or unit or be stored as a plurality of track portions, i.e., in a fragmented manner. The smallest fragment is one data byte.

LSA 120 maintains information for N+1 physical disk devices (DASD) or, in other words, for volumes of a data-storage system. Each volume 100 representative of primary and secondary volumes 32 and 60 is logically divided into a plurality of contiguously addressable areas termed LSA segment columns 104. Each LSA segment column 104 may consist of one cylinder of tracks. If data is stored in a fragmented manner, the totality of LSA segment columns 104 having like physical addresses in their respective volumes 32 and 60 constitute an LSA segment, represented by double-headed arrow 102. One of the LSA segment columns 104 in each LSA segment may contain error detecting redundancy for all of the other LSA segment columns in the LSA segment.

In a constructed embodiment the error detecting redundancy is parity, such as odd parity. The parity LSA segment column in the various LSA segments 102 are preferably on different ones of the physical volumes 32 and 60. Data formatted in count-key-data (CKD) or fixed-block (FB) formats are stored. Each logical track can be stored as a set of compress files entirely within one of the LSA segment columns 104. Many logical tracks are storable in each of the LSA segment columns 104. The physical location of each logical track or each of its storage fragments changes with each update.

LSA directory 120 includes a logical track field 122, a physical address field 124 and a length field 126, and maintains one entry for each logical track. Field 122 contains the logical track identification (logical address) including identification of each separately stored logical track fragment, i.e., byte, byte cluster, sector, etc. Field 124 contains the physical address at which the logical track including identification of each separate track fragment is stored. Field 126 relates to the length of the logical track and each track fragment stored in physical sectors (not shown) on volume 100. Accessing a logical track requires first accessing the LSA directory 120, then accessing the physical sectors in the respective LSA segment column. The entire LSA directory 120 is preferably stored in non-volatile random-access control memory NVRAM 116 to provide easy access thereto.

Writing data into LSA 120 preferably follows the below described procedure. Each write to LSA 120 is a logical track 106 or a fragment into an addressed one of LSA segment columns 104. Such addressed LSA segment column is not the LSA segment column currently storing data of such addressed logical track or fragment. If a logical track, or any of its fragments, of a logical volume has no data, then no data-storage space in LSA 120 is allocated respectively for the track or fragment. If data stored in LSA are updated, then a second copy of the logical track is recorded and the addressability of the original data is removed. For example, areas 108 and 110 represent updated data. To record the updated data, the replaced data of the respective logical tracks 108, or their fragments are written to a new data-storage location. Usual data-storage spacer recovery techniques, colloquially termed free space collectors, reclaim data-storage space in LSA segments 102. While recording data in a LSA segment, the above-described parity LSA segment is not recorded. When all of the N LSA segment columns are full, then the parity LSA segment columns N+1 is filled with parity or other error detecting redundancies. Of course, parity may be written earlier if desired for data stored within the given LSA segment. NVCACHE 113 storing updated logical track fragments enables deferring writing of such update data to DASD.

Referring still to FIG. 4, write directory 121 includes a data identification field 128, a LSA address field 130 and a sequence and time stamp field 132. Write directory 121 buffers address information for updated data to be stored in secondary data-storage system 57, but not yet addressable through secondary directory 61 for each pending write update session or one pending write update directory for all write update sessions. Field 128 identifies the particular data being updated. Field 130 relates to the particular LSA address for storing the updated data. Field 132 relates the sequence and time stamp to determine the order in which data is to be updated in volume 100, i.e., secondary volume 60.

Figure 5:
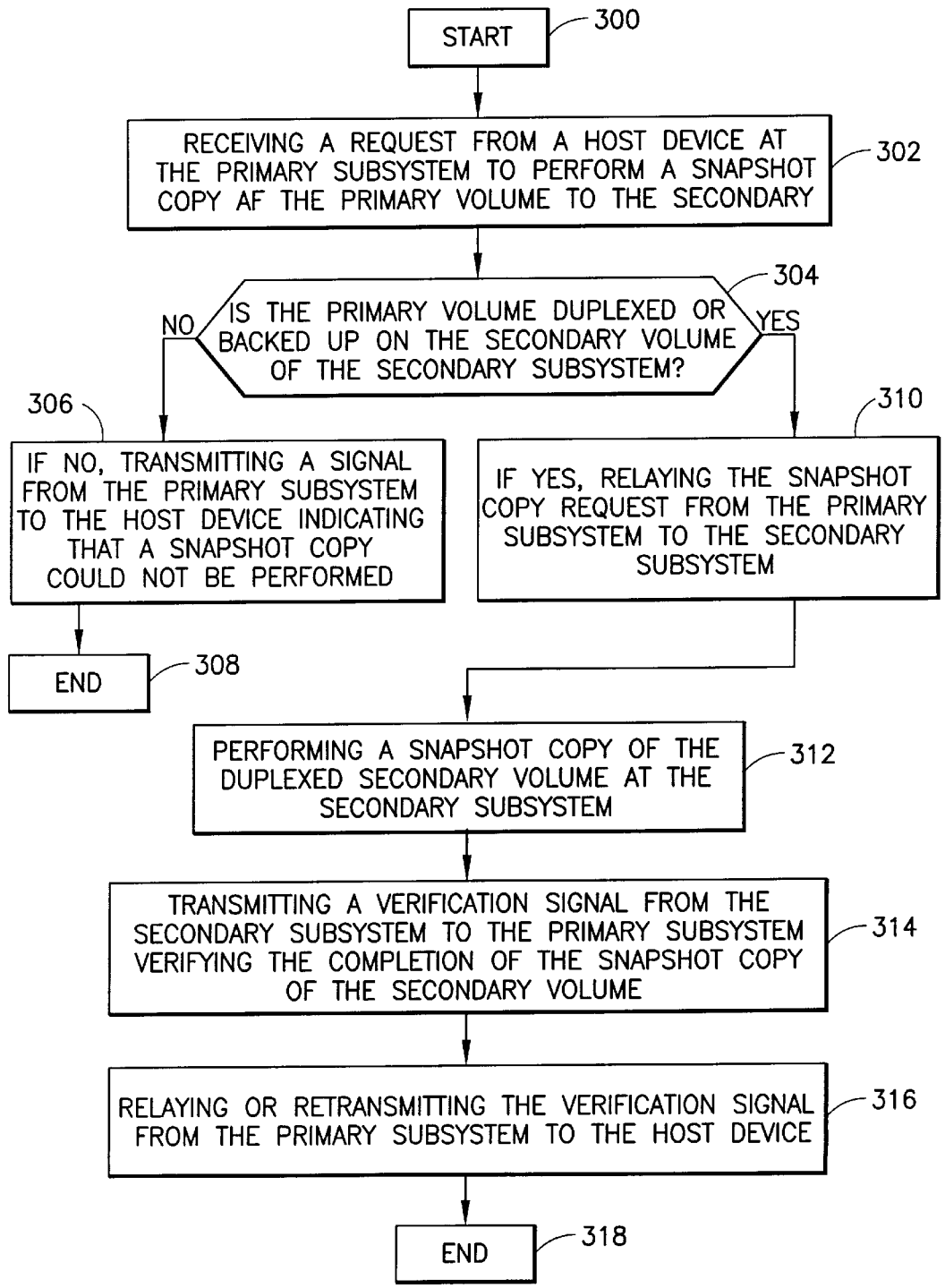
FIG. 5 illustrates a flow diagram of a snapshot copy operation of a secondary volume, in accordance with the present invention.

An operational example of the present invention is discussed below with reference to FIG. 5. Initially, a host device (not shown) requests a snapshot copy of primary volume 32 of primary subsystem 12 (Step 300). Primary subsystem 12 receives the request for a snapshot copy of primary volume 32 (Step 302). Primary subsystem 12 determines whether a remote copy session is in progress (Step 304). If a remote copy session is in progress, primary subsystem 12 transmits a message to the host device indicating that the snapshot copy operation cannot be performed at this instance of time (Steps 306 and 308).

Otherwise, primary subsystem 12 relays or retransmits the snapshot request to secondary subsystem 14 which performs a snapshot copy operation on secondary volume 60 (Step 310). The snapshot copy of secondary volume 60 is then stored in a tertiary volume locally or at a remote location, in virtual memory to be later archived or any other storage location other than secondary volume 60 (Step 312). It is preferred that a current snapshot copy overwrites a previous snapshot copy to minimize the required storage space for snapshot copies.

Once the snapshot copy operation is completed, secondary subsystem 14 transmits a verification signal to primary subsystem 12 to verify the completion of the snapshot copy of the secondary volume (Step 314). The verification signal may also include additional information indicating the location of the snapshot copy. Thereafter, primary subsystem 12 relays or retransmits the verification signal to the host device (Step 316) to complete the process (Step 318).

The invention having thus been described with particular reference to the preferred forms thereof, it will be obvious that various changes and modifications may be made therein without departing from the spirit and scope of the invention as defined in the appended claims.

What is claimed is:

1. An apparatus for performing a snapshot copy of a volume comprising:
    a primary storage subsystem including:
        (a) a primary data-storage device having at least a primary volume, and
        (b) primary processing means for receiving a request from a requester to perform a snapshot copy of at least a portion of said primary volume; and
    a secondary storage subsystem coupled to said primary storage subsystem and including:
        (c) a secondary data-storage device having a secondary volume, and
        (d) a secondary processing means;
    wherein, said primary processing means relays said request to said secondary storage subsystem, after verifying that said secondary volume is a duplicate copy of said primary volume, and said secondary processing means, in response to said request, performs an equivalent of a snapshot copy of said at least a portion of said primary volume by performing a snapshot copy of a corresponding portion of said secondary volume.

2. The apparatus as recited in claim 1, further comprising means for performing a backup copy operation of said primary volume to said secondary volume such that said secondary volume is a duplicate copy of said primary volume.

3. The apparatus as recited in claim 2, wherein said primary processing means relays said request, only if said backup copy operation is not in progress.

4. The apparatus as recited in claim 1, wherein said snapshot copy is stored in a tertiary remote volume.

5. The apparatus as recited in claim 1, wherein said snapshot copy of said at least a portion of said secondary volume is stored in virtual memory of said secondary storage subsystem.

6. The apparatus as recited in claim 1, wherein said primary storage subsystem includes a primary directory information which relates physical location of data on said primary volume to virtual addresses.

7. The apparatus as recited in claim 6, wherein said primary directory information is a log-structured array format.

8. The apparatus as recited in claim 1, wherein said secondary storage subsystem includes a secondary directory information which relates physical location of data on said secondary volume to virtual addresses.

9. The apparatus as recited in claim 8, wherein said secondary directory information is arranged in a log-structured array format.

10. The apparatus as recited in claim 1, wherein upon a completion of said snapshot copy, said secondary storage subsystem transmits a signal to said primary storage subsystem indicating completion of said snapshot copy operation, and said primary storage subsystem relays said signal to said requester.

11. The apparatus as recited in claim 1, wherein said primary processing means verifies that said secondary volume is a duplicate copy of said primary volume by ensuring that said primary volume and said secondary volume are in a duplexed state.

12. A method for performing a snapshot copy of a volume, comprising the steps of:

receiving from a requester a request at a primary storage subsystem to perform a snapshot copy of at least a portion of a primary volume of said primary storage subsystem;

determining if a secondary storage subsystem has a secondary volume that is a duplicate of said primary volume;

relaying said request from said primary storage subsystem to said secondary storage subsystem, if said secondary volume is determined to be a duplicate of said primary volume; and generating an equivalent of a snapshot copy of said at least a portion of said primary volume by performing a snapshot copy on a corresponding portion of said secondary volume.

13. The method as recited in claim 12, wherein said primary storage subsystem includes means for performing a backup copy operation of said primary volume to said secondary volume, such that said secondary volume is a duplicate of said primary volume.

14. The method as recited in claim 13, wherein said step of generating is performed if said backup copy operation is not in progress.

15. The method as recited in claim 12, wherein said step of determining further comprises the step of ensuring that said primary volume and said secondary volume are in a duplexed state.

16. The method as recited in claim 12, further comprising, upon a completion of said step of generating, the steps of:

transmitting a signal from said secondary storage subsystem to said primary storage subsystem indicating completion of said snapshot copy operation; and relaying said signal from said primary storage subsystem to said requester.

* * * * *